United States Patent [19]
Church

[11] 3,898,314

[45] *Aug. 5, 1975

[54] METHOD OF MOLDING RUBBER ARTICLES

[75] Inventor: Herman S. Church, Cuyahoga Falls, Ohio

[73] Assignee: Teledyne Mid-America Corporation, Hartville, Ohio

[ * ] Notice: The portion of the term of this patent subsequent to Dec. 4, 1990, has been disclaimed.

[22] Filed: Oct. 17, 1973

[21] Appl. No.: 407,093

Related U.S. Application Data

[63] Continuation-in-part of Ser. No. 225,065, Feb. 10, 1972, Pat. No. 3,776,998.

[52] U.S. Cl. ............... 264/294; 264/318; 264/325; 264/328; 264/329; 264/335; 264/338; 264/DIG. 66; 425/437; 425/DIG. 102
[51] Int. Cl. ........................ B29h 3/12; B29c 7/00
[58] Field of Search ........... 264/155, 156, 294, 296, 264/318, 325, 328, 329, 335, DIG. 66, 338; 425/437, 438, DIG. 102

[56] References Cited
UNITED STATES PATENTS

| | | | |
|---|---|---|---|
| 142,911 | 9/1973 | Hill | 264/156 |
| 1,519,564 | 12/1924 | Thompson | 264/294 |
| 2,663,902 | 12/1953 | Anderson | 425/437 |
| 2,726,925 | 12/1955 | Saulino | 264/294 X |

*Primary Examiner*—Robert F. White
*Assistant Examiner*—Thomas P. Pavelko
*Attorney, Agent, or Firm*—Frease & Bishop

[57] ABSTRACT

An improved method of molding rubber articles in which uncured rubber is preheated to a soft, workable condition in a warm-up mill located immediately adjacent to an injection press. The warm uncured rubber is transferred to the press and then by a press plunger mechanism into cavities of a mold cavity plate. The plunger mechanism and cavities are coated with Teflon to prevent sticking of the rubber. A mold lid with pressure pins then is placed on the cavity plate and pressed in an auxiliary press to displace rubber within the cavities and to form openings through the rubber articles being produced. The displaced rubber is forced into a groove formed between the cavity plate and lid surrounding the cavity formation at the parting line between the lid and cavity plate, and the rubber in the groove forms a circumferential rib around the molded article. The rubber in the cavities is cured at the desired temperature for the required amount of time while maintained under pressure. After curing, the mold lid is removed and the molded rubber articles are removed from the cavities by an air ejector mechanism. Air nozzles are inserted into the openings formed by the pressure pins and a blast of high pressure air breaks the bond between the molded articles and cavity plate. Threaded tips preferably are formed on the air nozzles to grip the molded articles and lift them from the mold plate. The gripped articles then are knocked off the nozzle tips and deposited on a conveyor.

7 Claims, 11 Drawing Figures ns and can add contaminants to the rubber compound being molded. Furthermore, the addition of such mold release material before each molding operation involves time delay and expense.

METHOD OF MOLDING RUBBER ARTICLES

CROSS REFERENCE TO A RELATED APPLICATION

The invention involves improvements in the method of molding rubber articles set forth in copending application, Ser. No. 225,065, filed Feb. 10, 1972; now U.S. Pat. No. 3,776,998 issued Dec. 4, 1973 and this application is a continuation-in-part thereof.

BACKGROUND OF THE INVENTION

1. Field of the Invention

The invention relates to the molding of rubber articles from uncured rubber in molds pressed in typical rubber molding presses while maintained under compression at curing temperature, whereby the articles have the desired finished configurations or shapes imparted by the shapes of the cavities formed in the mold cavity plates. More particularly, the invention relates to improvements in a method of molding rubber articles which almost completely eliminates the formation of cured scrap rubber heretofore produced in molding rubber articles in accordance with prior transfer molding procedures; and which eliminates any defects in the cured products incident to the formation of a thin flash.

2. Description of the Prior Art

Rubber articles conventionally are molded by procedures known either as "transfer molding" or as "compression molding," as described in said application Ser. No. 225,065. Transfer molding produces "pot flash" which is useless insofar as value to the product being molded. It has little inherent value and is usually scrapped. Depending upon the shape of the part being molded, mold design and other factors, such scrap cured rubber may constitute a substantial percentage of the weight of the final molded product, which the improved method substantially eliminates.

Compression molding procedures eliminate much of the rubber waste associated with transfer molding, but expensive weighing procedures must be used. Often, it is impractical to mold complex shapes by compression molding. Further, it is very time consuming to load the individual cavities of a multiple cavity mold with carefully weighed uncured rubber charges.

Many of these problems have been solved by the method of molding rubber articles described in said copending application Ser. No. 225,065; but some problems still remain.

Heretofore, the partially heated uncured rubber placed in the press was heated on a warm-up mill located at a site remote from the master press. After warm up the rubber was conveyed on a forklift truck or the like to the press. This involves expense, time delay and requires working the rubber in the warm-up mill to a higher temperature than required at the press, so that it has the desired temperature when it arrives at the press. Thus, accurate temperature control has been difficult to maintain due to cooling during transit, and costs are increased due to the transportation and handling involved.

It is preferable in transfer molding procedures that a mold release compound be applied to the bottom surface of the plunger in the press as well as to the bottom surface of the mold cavity prior to each cycle of operation to prevent the molded articles from sticking in the press after curing. Such "release" material, however, comes in contact with the uncured rubber, both before the injection and after injection, and can add contaminants to the rubber compound being molded. Furthermore, the addition of such mold release material before each molding operation involves time delay and expense.

Heretofore, the rubber articles being molded are subjected to compression and are maintained under pressure in the cavity at curing temperature by pressure pads which extend partially into the mold cavity, holding the rubber under compression therein. The compressive force, thus is exerted on the rubber in the mold cavity from only one direction. As a result, pressure may not be distributed uniformly throughout the rubber contained in the cavity.

It is desirable in the molding of rubber articles to quickly and conveniently remove the molded articles from the mold after curing to reduce the cost factor per molded article. Heretofore, the molded articles were removed individually by hand or individually by a high pressure air nozzle. Such removal step was time consuming especially where a large number of articles are molded during each molding operation, since the molded articles have a tendency to adhere to the mold cavities despite the addition of the mold release compound. Many times the molded articles have to be removed manually, individually by operating personnel.

When molding rubber articles in a mold cavity having upper and lower portions which form a parting line therebetween, a small amount of flash rubber usually is forced outwardly along this parting line. It has been discovered that the flash rubber thus formed, even though it only may be 0.005 inch thick, upon cooling may create a thin hairline-like crack or recess in the outer surface of the molded product adjacent to the mold parting line. This crack or recess is known as "back rind" and may form a defect or possible stress point at a crucial surface of the molded article. Thus, prevention of such "back rind" is desirable in order to form a molded rubber article of extremely high quality which is able to meet rigid specifications and pass related tests.

Thus, the need exists for further improvements in the molding of rubber articles which eliminate transporting preheated uncured rubber from a warm-up mill to the press, which eliminate the use of mold release materials on press component surfaces before each molding operation, which provide an improved means of holding the rubber under compression within the cavity, which provide improved means of removing and stripping molded articles from the mold after cooling, and which prevent the formation of back rind on the molded rubber article.

SUMMARY OF THE INVENTION

Objectives of the present invention include retaining all of the advantages and achieving the objectives set forth in said application Ser. No. 225,065, and at the same time providing an improved method of molding rubber articles in which warmup mills are located adjacent the press to eliminate separately conveying by material handling equipment heated uncured rubber from the mill to the press thereby achieving more accurate temperature control and reducing costs; providing an improved method of molding rubber articles in which the press components which contact the uncured rubber are coated with Teflon to provide a generally permanent non-sticking coating thereto, to eliminate the use of mold release material during each molding operation and its resultant cost and contamination; providing an improved molding procedure in which the mold cavity assemblies have compression pins which subject the rubber being molded to compression and maintains the same under pressure in the cavity at curing temperature while at the same time forming a desired opening or openings through the product being molded, which openings may function to receive stripping devices and provide a means of removing the articles from the mold cavities after curing; providing an improved molding procedure in which air nozzle extraction means may be used for convenient and rapid removal of the molded article from the mold cavities, to thus eliminate manual removal procedures; providing an improved method of molding rubber articles which prevents the formation of "back rind" on the produced articles by forming of a circumferential rib on the molded article at the parting line between the upper and lower mold elements; and providing an improved method of molding rubber articles which eliminates difficulties heretofore encountered, achieves the various objectives indicated in a simple, effective and inexpensive manner, and solves problems and satisfies needs which long have existed in the art of molding rubber articles.

These objectives and advantages are obtained in a rubber molding method of a type wherein a supply of uncured rubber is maintained in a pot chamber at a heated temperature below curing temperature to retain the uncured rubber in a soft, workable condition, the heated uncured rubber is transferred to a mold cavity formed by a lower mold element and a mold lid, then is enclosed and pressed in the mold cavity to displace the rubber in the cavity, and wherein the enclosed charge of rubber is cured while held under pressure to form a molded rubber article; the improvements including the steps of locating a warm-up mill immediately adjacent the pot chamber supply of heated uncured rubber; heating a charge of uncured rubber in the warm-up mill; transferring the heated charge of uncured rubber directly to the pot chamber; then transferring heated rubber from the pot chamber to the mold cavity; coating the mold cavity with a layer of material having non-sticking properties with respect to the uncured rubber; inserting pin means into the enclosed charge of uncured rubber in the mold cavity to displace and hold the rubber under compression in the cavity and to form opening means through the rubber article being molded; displacing rubber outwardly from the cavity into groove means formed surrounding the mold cavity at the parting line between the mold lid and lower mold element to form a circumferential rib on the rubber article; forming projection means on the lower portion of the rubber article by displacing rubber outwardly from the cavity into groove means formed in the lower mold element adjacent the bottom surface thereof thereby to assist in retaining the rubber article in the lower mold element when the mold lid is removed therefrom; removing the mold lid from the lower mold element after curing; inserting air nozzle means into said opening means formed in the rubber article; preferably gripping the molded rubber article by the air nozzle means; injecting air from the nozzle means through the opening against the bottom surface of the mold cavity to loosen the bond formed during curing between the molded article and the cavity; moving the air nozzle means relative to the lower mold element to remove the molded rubber article from the lower mold element whereby the article is retained on and gripped by the nozzle means; and removing the gripped article from the air nozzle means after removal of the article from the lower mold element by engaging kicker plate means.

BRIEF DESCRIPTION OF THE DRAWINGS

Preferred method steps of the invention — illustrative of the best mode in which applicant has contemplated applying the principles — are illustrated somewhat diagrammatically in the drawings, are set forth in the following description, and are particularly and distinctly pointed out and set forth in the appended claims.

Similar numerals refer to similar parts throughout the drawings.

DESCRIPTION OF THE PREFERRED STEPS OF THE IMPROVED METHOD

Figure 1:
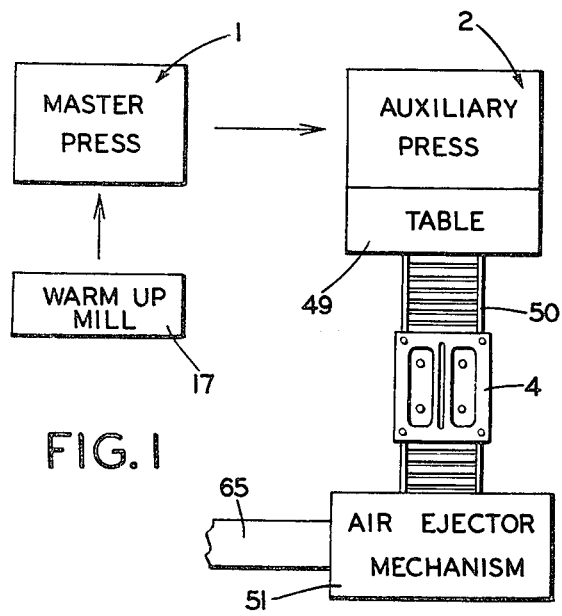
FIG. 1 is a diagrammatic view illustrating an auxiliary press, a warm-up mill, and air ejector mechanism in combination with a master press used in production operations to carry out the improved molding procedure.

The improved method preferably involves the use of two presses to carry out the procedure of molding a rubber article or product as described in copending application, Ser. No. 225,065. The presses comprise a master press generally indicated at 1 and one or more auxiliary presses 2, as shown in FIG. 1. In production, one master press 1 may serve a number of auxiliary presses 2.

The master press 1 includes a transfer mold assembly unit generally indicated at 3. Mold unit 3 has a lower cavity plate 4 having any number of cavities 5 formed therein, where multiple cavity molds are used. Cavity plate 4 however may contain only a single cavity 5.

Mold unit 3 also includes a sprue plate 6 and a plunger 7. The sprue plate 6 is slidably mounted on slide rods 8 extending between the press head 9 and press base 10. The plunger 7 is fixed to the upper platen 11 of press 1 and is cooperatively arranged to press into the compartment or pot chamber 12 of sprue plate 6 to form a modified pot structure, when the mold unit 3 is closed. When the mold unit 3 is opened as shown in FIG. 2, the sprue plate 6 slides down guide rods 8 to a position held by sprue plate stops 13, to allow access to the pot area in order to load uncured rubber.

In the open mold position of FIG. 2 the hydraulic press ram 14 is lowered and the bolster plate 15 and lower platen 16 are spaced below sprue plate 6. The cavity plate 4 rests on lower platen 16 and may be moved onto or off of platen 16 laterally from or to a work table at one side of press 1.

Figure 2:
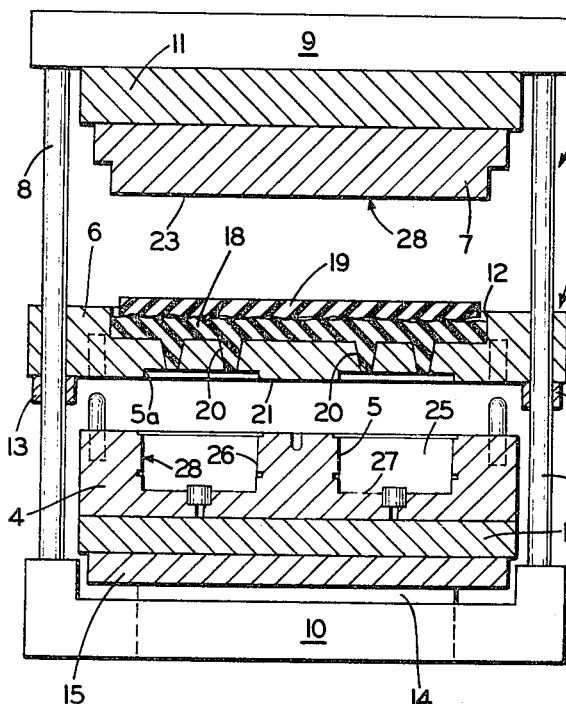
FIG. 2 is a diagrammatic sectional view of the molding components used in a master press with the mold cavity plate open and uncured rubber in the pot compartment of the sprue plate, movably mounted on and held by the press.

FIG. 2 shows uncured rubber 18 residue from the last injection or transfer step in the pot chamber 12, as well as a fresh uncured rubber charge 19. Sprue holes 20 communicate between the bottom of pot chamber 12 and upper mold cavity portions 5a formed in the lower surface 21 of sprue plate 6.

The upper platen 11, sprue plate 6, and lower platen 16 each are equipped with heating means so as to control the temperatures of each of members 11, 6 and 16. Preferably the upper platen 11 is maintained at a temperature of 180° F., the sprue plate 6 at a temperature of 200° F., and the lower platen 16 at a temperature of 330° F. Thus, the lower platen heats the cavity plate 4 to the 330° F. temperature which is the normal curing temperature used for curing rubber compound articles. The sprue plate temperature of 200° F. is substantially below curing temperature so that uncured rubber 18–19 contained in the pot chamber 12 remains in an uncured condition.

Figure 3:
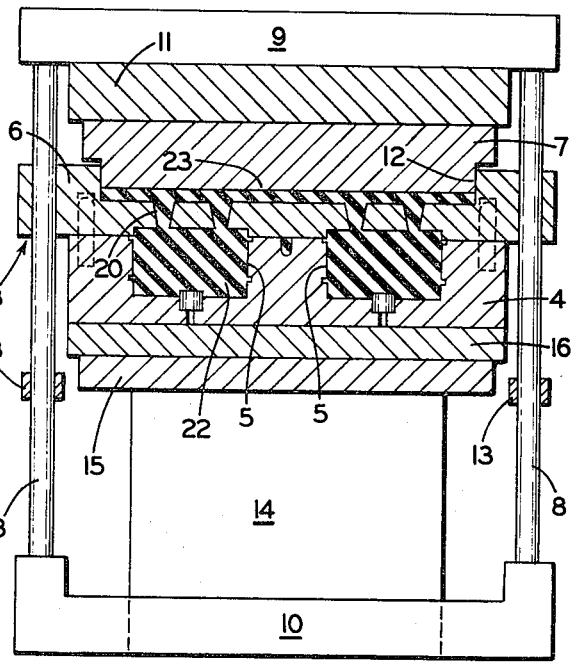
FIG. 3 is a view similar to FIG. 2 showing the mold plate component in closed position with the mold cavities filled with uncured rubber.

In FIG. 2 the ram 14 is down, a new mold cavity plate 4 is in position on the lower platen 16, fresh uncured rubber stock 19 has been added to pot chamber 12 in sprue plate 6, and the various parts are ready for a new transfer cycle. This is accomplished by raising ram 14 to the position shown in FIG. 3 which closes mold unit 3. Plunger 7 enters pot chamber 12 and injects uncured rubber 18–19 through sprue holes 20 into cavities 5. The cavities 5 are closed by contact of the upper surface of cavity plate 4 against the lower surface 21 of sprue plate 6.

In accordance with the invention the uncured rubber 19 has been heated to between 180° F. and 200° F. on a warm-up mill 17 located immediately adjacent master press 1. Warm-up mill 17, shown in block diagram form in FIG. 1, is of the usual type having a pair of rotating rolls between which the uncured rubber is passed. The continued pressure working of the rubber between the rolls heats it to a temperature approximately in the range of 180° F. to 200° F. which renders it soft enough to be transferred directly into pot chamber 12 to add to the uncured rubber residue 18 therein.

The location of warm-up mill 17 immediately adjacent master press 1 enables an operator to take the heated rubber 19 from the mill and place it in press 1 without the heretofore expensive and time-consuming procedure of transferring such heated rubber by forklift truck or the like from a distant warm-up mill to the press.

Likewise, the heated rubber 19 will not cool down appreciably during transfer, as is the case with a remote location of the warm-up mill 17, due to the short transfer distance between warm-up mill 17 and press 1. Thus, more accurate temperature control can be achieved in the molding procedure.

When the transfer operation from pot chamber 12 to cavities 5 completely fills cavities 5, the ram 14 is lowered. At this point, the rubber 22 in cavities 5 has not cured, and the cavity plate 4 is again in the position of FIG. 2.

Further in accordance with the invention, bottom surface 23 of plunger 7, and front and rear walls 24 and 25, side walls 26 and bottom wall 27 of cavity 5, are coated with a permanent layer of material 28 having non-sticking properties, such as sold under the trademark, Teflon. Such permanent coating eliminates the spraying of a mold release compound on these surfaces heretofore used prior to each cycle of operation of press 1, thereby reducing the time required for each molding operation and eliminating the possible contamination of the rubber charge by the release compound.

Figure 6:
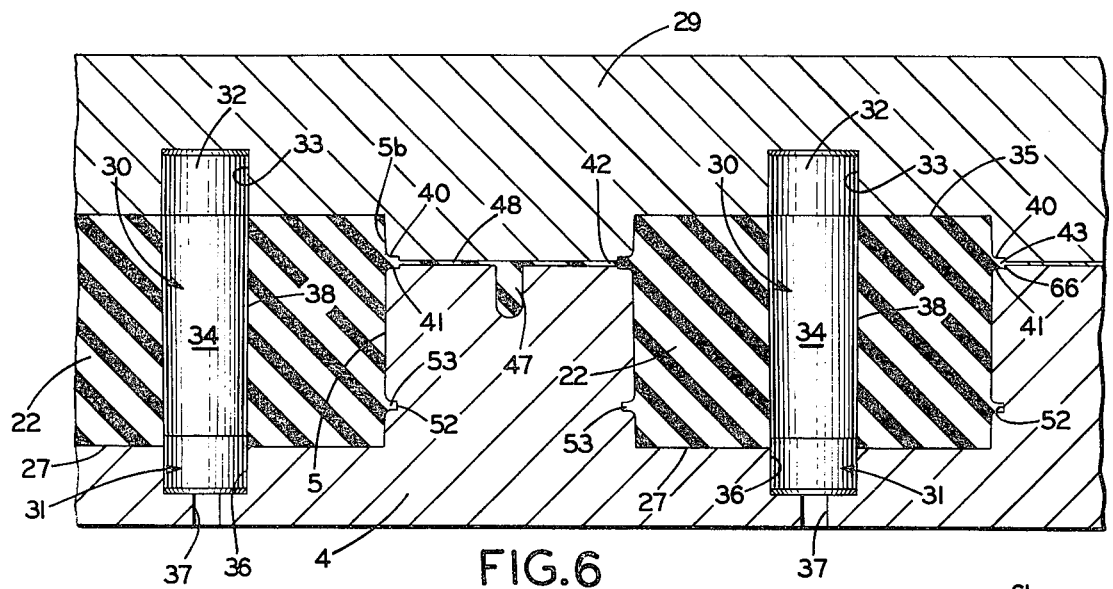
FIG. 6 is an enlarged fragmentary sectional view of the mold assembly unit during the curing operation.

Another important feature of the invention is the use of one or more pressure pins 30 on lid 29 of the mold plate assembly unit, and corresponding shallow pins 31 on cavity plate 4. Lid pins 30 each includes a cylindrical portion 32 retained preferably by press fit in openings 33 formed in lid 29 and pins 30 have slightly tapered shank portions 34 projecting downwardly from top wall 35 of upper cavity portion 5b (FIG. 6).

Cavity pins 31 are cylindrical and are seated within openings 36 formed in bottom wall 27 of cavity 5 and extend only a slight distance above walls 27 into cavities 5. Knockout holes 37 are formed in cavity plate 4 and are aligned with pins 31 to provide a means of removing pins 31 therefrom should they become damaged.

Figure 4:
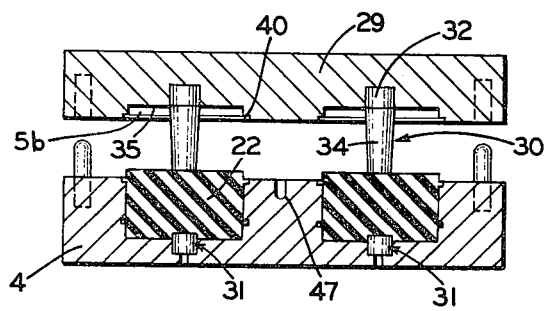
FIG. 4 is a diagrammatic view showing the cavity plate removed from the master plate of FIG. 3 with injected uncured rubber in the mold cavities, and showing the mold lid being mounted on the cavity plate prior to closing the same.

After filling the cavities 5 with rubber 22, cavity plate 4 is moved out of press 1 onto a work table where lid 29 is applied, as shown in FIG. 4. When lid 29 is pressed to seat on the top of cavity plate 4 lid pins 30 mate with and seat upon bottom cavity pins 31, as shown in FIG. 6. Pins 30 and 31 displace a small volume of rubber 22 in the cavities 5 and 5b and form openings or voids 38 through the molded rubber article 39 when lid 29 is seated upon cavity plate 4 prior to curing.

A shoulder 40 is formed in lid 29 completely surrounding upper cavity portions 5b and aligns with a similar corresponding shoulder 41 which is formed in cavity plate 4 and completely surrounds cavities 5. Shoulders 40 and 41 abut at the parting line 42 between lid 29 and plate 4 and together form a groove 43 which prevents the formation of "back rind" on molded articles 39 which may occur if no such groove is provided in the mold assembly.

Back rind results from the flow of rubber outwardly from the cavity in the parting line, even though such flash rubber may only be 0.005 inch thick. This flash rubber expands as a result of the heating during curing, and on removal and cooling this thin flash zone may contract to the extent of forming a hairline crack or recess in the final molded product. Thus, a defect or stress may occur at a critical zone on the surface of the molded product. Prevention of this back rind is especially important in high quality molded rubber products which must meet rigid specifications and inspection tests.

After assembly of cavity plate 4 and lid 29 as shown in FIG. 6, they are moved to an auxiliary press 2 (FIG. 5), placed on the lower platen 44 of press 2, and ram 45 is raised to press the mold unit 4-29 against upper platen 46 of press 2.

Figure 5:
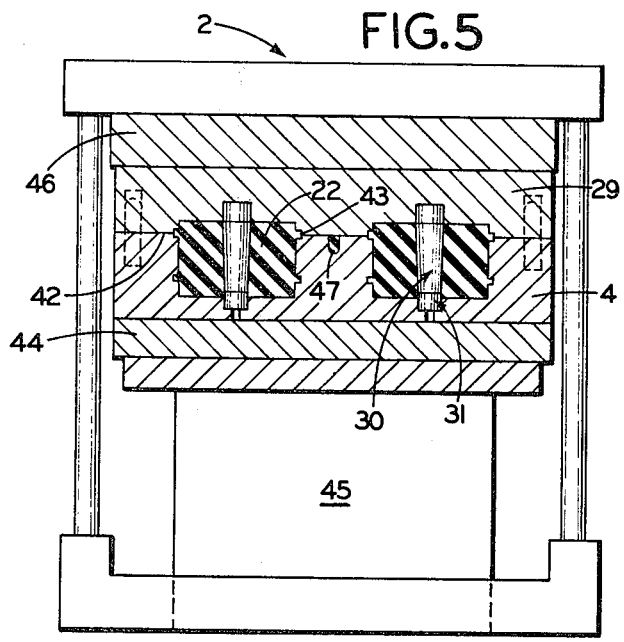
FIG. 5 is a view similar to FIGS. 2 and 3 of an auxiliary press in which a cavity plate and lid, forming the mold assembly unit of FIG. 4, are closed to hold the rubber in the cavities under compression at the required curing temperature for the required amount of time to effect a cure.

Rubber 22 is forced into back rind groove 43 forming a circumferential rib 66 on each molded article 39 as the mold unit 4-29 is forced completely closed with pins 30 seating on pins 31, as shown in FIGS. 5 and 6. The slight excess rubber 22 in cavities 5 which is displaced by pressure pins 30 is forced into flash grooves 47 formed in cavity plate 4 between adjacent cavities 5. The mold unit 4-29, with rubber 22 in its cavities 5 holds the rubber under pressure in auxiliary press 2 while the rubber is cured in the normal manner for the required amount of time at approximately 330° F.

Even though the bottom surface of lid 29 is pressed against the top surface of cavity plate 4, there will be a slight amount of space 48 along parting line 42 through which the excess rubber flows and collects in flash grooves 47, as shown in FIG. 6. Such tolerances also permit the mating of pins 30 and 31 to form openings 38 in molded articles 39. A thin layer of rubber may be formed between pins 30 and 31 in openings 38 should the pressure pins not seat tightly with respect to each other. Such rubber layer, however, presents no problem and usually is removed by the blast of high pressure air during removal of molded articles 39 from cavity plate 4.

Figure 11:
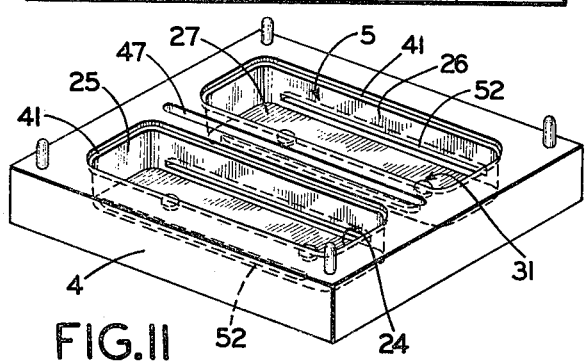
FIG. 11 is a perspective view diagrammatically illustrating the cavity plate of the mold assembly unit shown in FIGS. 2-5.
Figures 7, 9:
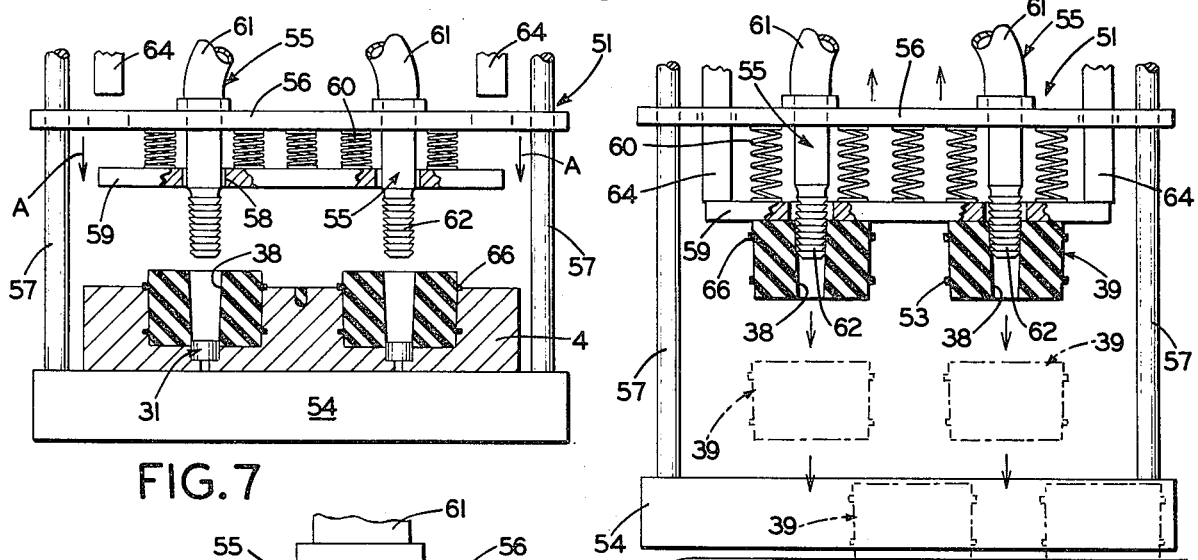
FIG. 7 is a diagrammatic view showing the mold assembly unit placed in the air ejector mechanism after curing; 3
FIG. 9 is a diagrammatic view showing the air ejector mechanism in raised position with the molded articles shown in dot-dash lines, dropping from the air nozzles to a conveyor.
Figure 8:
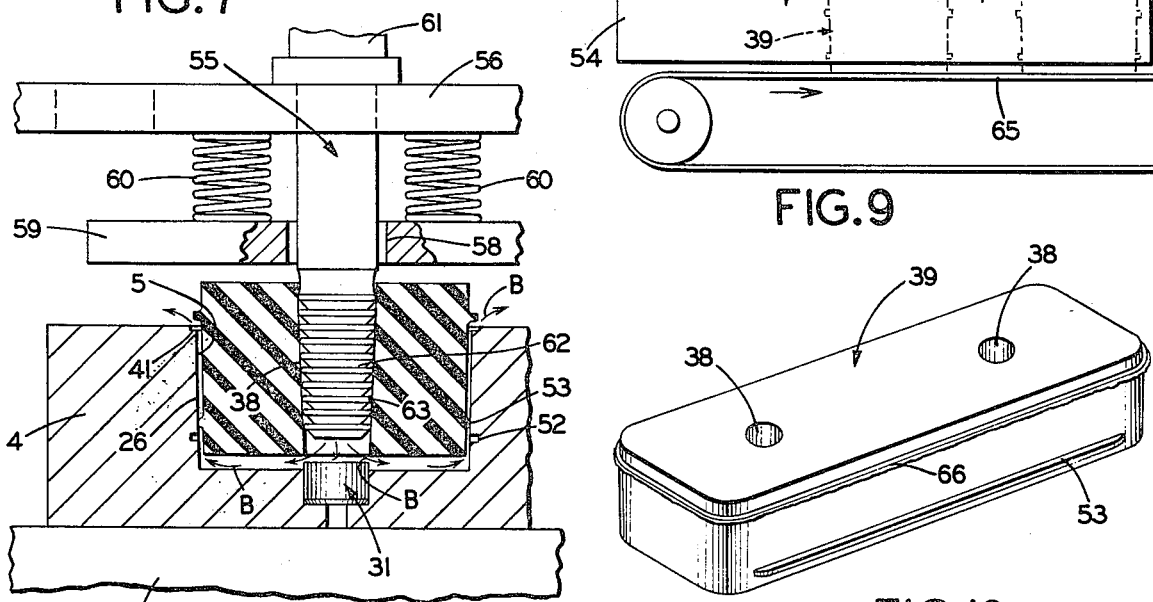
FIG. 8 is an enlarged fragmentary diagrammatic view of an air nozzle inserted within a molded rubber article prior to removal of the article from the lower mold element.
Figure 10:
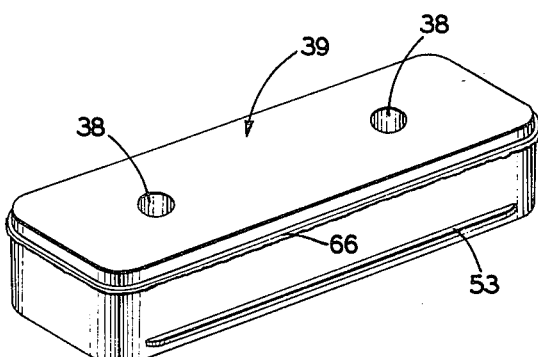
FIG. 10 is a perspective view of a rubber article molded in one of the cavities of the mold assembly.

After curing has been completed, ram 45 is lowered, the mold unit 4-29 is removed to a work table 49 for one of the auxiliary presses 2, indicated diagrammatically in FIG. 1. The lid 29 then is removed to expose cavity plate 4 (FIG. 11), and a portion of each molded article 39 and an end of void 38. Mold plate 4 together with molded articles 39 therein are moved along a conveyor 50 to an air ejector mechanism 51 for removal of articles 39 from cavities 5, as shown in FIGS. 7, 8 and 9. Rubber article 39, thus molded is shown in FIG. 10 and may have any desired or required shape or configuration, imparted by the shape of the mold cavity 5.

Grooves 52 also are formed in side walls 26 of cavities 5 adjacent bottom wall 27. Some rubber 22 is forced into grooves 52 upon pressing and displacement of rubber 22 by pressure pins 30 and forms retaining ribs 53 along the sides of rubber article 39. Ribs 53 assist in retaining molded articles 39 within cavities 5 upon removal of lid 29, yet they do not prevent removal of articles 39 by air ejector mechanism 51, as described below.

In accordance with the method described in said copending application, Ser. No. 225,065, during the time when the first cavity plate 4 is on a work area and is being fitted with a lid 29, and thereafter placed in one of the auxiliary presses 2, a second empty cavity plate 4 is positioned on the lower platen 16 of master press 1, as shown in FIG. 2. Additional uncured rubber 19 is placed in the pot on top of the residue 18 remaining therein after transfer of rubber into the first described cavity plate 4.

The second cavity plate 4 is closed by raising ram 14 against sprue plate 6 and fixed plunger 7, and uncured rubber is ejected into the cavities 5 of the second cavity plate 4. When the cavities are completely filled, ram 14 is lowered, and the second cavity plate 4 is removed and fitted with another lid 29 and placed in another auxiliary press 2.

These operations are continued with additional cavity plates 4 which are charged with uncured rubber in master press 1 and supplied to one of a number of adjacent auxiliary presses 2 until the first used cavity plate 4 has been stripped, cleaned and again in condition for being charged with uncured rubber in master press 1.

Thus, one master press 1 is used in conjunction with a number of auxiliary presses. The rubber residue 18 in the master press sprue plate 6 left from one transfer operation is used with the addition of more uncured rubber 19 from the warm-up mill 17 for the next transfer operation and so on.

Ejector mechanism (FIGS. 7, 8 and 9) 51 includes a base 54 which supports cavity plate 4. A plurality of nozzles 55 are mounted on a plate 56 which is slidably mounted on a pair of sliding rods 57 for vertical movement therealong. Nozzles 55 extend through openings 58 formed in a kicker plate 59 which is resiliently mounted beneath nozzle mounting plate 56 by a plurality of springs 60. Air hoses 61 connect nozzles 55 to a remote source of high pressure air.

After insertion of cavity plate 4 beneath nozzles 55, plates 56 and 59 move vertically downwardly as indicated by arrows A, FIG. 7. Nozzle tips 62 are inserted into the exposed ends of voids or openings 38 of molded articles 39 until the lower tip ends are adjacent the top of bottom cavity pins 31. A switch is tripped automatically after plate 56 has descended the necessary distance, which ejects a flow of high pressure air through lines 61 and nozzles 55 against bottom pin 31, indicated by arrows B, FIG. 8. The air is forced along bottom surface 27 and sides 26 of cavities 5 beneath article 39 and breaks the bond established between article 39 and cavities 5 during curing. Articles 39, upon injection of this high pressure air, will "pop" free of their bond with the walls of cavity 5 and move partially upwardly from cavities 5.

Nozzle tips 62 preferably have circumferential threadlike formations 63 with rounded corners which have a radius slightly larger than the radius of openings 38. Nozzle tips 62 expand openings 38 slightly and threads 63 grip article 39 when nozzles 55 are inserted into holes 38 upon lowering of plate 56.

Plate 56 then moves upwardly after injection of the high pressure air, removing articles 39 easily from cavities 5 with articles 39 remaining on tips 62 of the air nozzles. Plate 56 continues to move upwardly along slide rods 57 until kicker plate 59 contacts stop members 64. Plate 56 continues upwardly together with nozzles 55 and articles 39 expands springs 60, a sufficient distance after plate 59 is stopped by stops 64 until articles 39 are removed from nozzle tips 62 by contacting kicker plate 59, as shown in FIG. 9.

Articles 39 drop downwardly as shown in dot-dash lines, FIG. 9, upon a conveyor 65 located beneath air ejector mechanism 51. Conveyor 65 moves the deposited molded rubber articles along to a collection or packaging station.

Thus, air ejector 51 automatically breaks the bond between articles 39 and mold cavities 5 by a blast of high pressure air, and further grips articles 39 by insertion of nozzle tips 62 in openings 38. Nozzles 55 then lift the molded articles from within cavities 5 and deposits them automatically on a conveyor or in a collection hopper upon continued upward movement of nozzle mounting plate 56 after kicker plate 59 is stopped by stop members 64. Thus, the individual manual removal of the molded articles from the cavity plates as heretofore required is eliminated completely. The elimination of such manual removal is extremely important in molding operations in which each cavity plate 4 is provided with a considerable number of cavities 5. For example, fifty or more cavities 5 may be formed in a single mold plate 4.

Some of the important and novel features of the present invention include the initial heating of the uncured rubber to a soft and pliable condition by a warm-up mill positioned immediately adjacent the master press, and the coating of the plunger and mold cavities of the master press permanently with a material having non-sticking properties.

Another important feature of the improved method is the provision of pressure pins on the mold lid which project into the uncured rubber charge in the mold cavities and mate with corresponding lower pin sections extending upwardly from the cavity bottom surfaces to displace the rubber under pressure outwardly therefrom and to form openings in the article being molded. These openings serve the dual function of providing attachment and mounting openings for the rubber article in a final assembled product in which they may be incorporated, and function as a means by which the molded rubber articles are removed from the molds after curing.

Another important feature of the invention is the formation of the circumferential back rind prevention rib 66 on each molded rubber article 39 at the parting line between lower mold element 4 and mold lid 29. The rubber displaced outwardly by pins 30 and 31 flowing into circumferential notches 40 and 41 formed completely about the upper and lower mold sections at parting line 42 forms the back rind preventing rib 66. The displaced rubber also flows into grooves 52 formed in the lower mold element and forms retaining ribs 53 on the lower portion of molded rubber articles 39 to assist in retaining the molded rubber article within mold plate cavity 4 upon removal of lid 29 after curing.

A still further feature of the improved method is the automatic simultaneous removal of all the molded rubber articles after curing from the mold cavities by air ejector mechanism 51. Air nozzles 55 are inserted into the openings 38 formed in articles 39 by pins 30 and 31, followed by the injection of a blast of high pressure air against the bottom surface of the lower cavity to break the bond with the molded article. Nozzles 55 subsequently lift the molded articles from cavities 5 by the gripping action of nozzle tips 62. The gripped rubber articles then are removed automatically and deposited for collection in a hopper or on a conveyor by engagement of the gripped molded articles with kicker plate 59.

Summarizing, important advantages achieved by the new procedures of the present invention, include the location of a warm-up mill immediately adjacent the master press to eliminate the additional cost in transferring such preheated uncured rubber from warm-up mills remote from the master press, with the subsequent undesirable fluctuation of the rubber temperature during transit, include the coating of the press plunger mechanism and cavity surfaces with a permanent non-sticking material such as Teflon to eliminate the addition of a mold release compound to such components prior to each molding operation; include the formation of openings in the molded rubber articles by complementary pin means formed on the bottom surface of the mold cavity and on the cavity lid which displace the rubber internally, radially, outwardly from the pin means to completely and uniformly fill the mold cavities; include the formation of circumferential notches in the lower mold element and lid at the parting line therebetween to form a circumferential rib on the molded article to prevent the formation of back rind on the molded article; include the provision of grooves in the lower mold element adjacent the bottom portion of the cavity to form projections on the lower portion of the molded articles to assist in retaining the molded articles within the cavities upon removal of the mold lid; and include the removal of the molded rubber articles after curing from the mold cavities by air ejector means which breaks the bond between the molded article and the cavity walls, and lifts the articles from the mold cavities, and which then automatically deposits the same in a collection hopper or conveyor.

Although the above described steps are indicated as being incorporated into the specific method described in copending application, Ser. No. 255,065, wherein one of the features is the step of separating the mold assembly unit from the master press prior to curing; the new procedures of the invention also may be incorporated into a method of molding rubber articles in which the cavity filling, holding under pressure and curing steps all are performed in a single press, without departing from the invention.

In the foregoing description, certain terms have been used for brevity, clearness and understanding but no unnecessary limitations are to be implied therefrom beyond the requirements of the prior art because such terms are used for descriptive purposes herein and are intended to be broadly construed.

Moreover, the description and illustration of the invention is by way of example and the scope of the present invention is not limited to the exact details of construction.

Having now described the features, discoveries and principles of the invention, the manner in which the improved rubber article molding procedure is carried out, the characteristics of the new concept, and the advantageous, new and useful results obtained; the new and useful methods, steps and procedures are set forth in the appended claims.

I claim:

1. In a rubber molding method of the type wherein a supply of uncured rubber is maintained in a pot chamber at a heated temperature below curing temperature to retain the uncured rubber in a soft, workable condition, then a charge of the heated uncured rubber is transferred to a mold cavity formed partially by a lower mold element, then the transferred charge of uncured rubber is separated from the supply of uncured rubber in the pot chamber, then a mold lid is placed on the lower mold element to enclose, press, and displace the uncured rubber in the cavity, and then the enclosed charge of uncured rubber is cured while held under pressure in the cavity at curing temperature to form a molded rubber article; the improvements including the steps of inserting pin means into the charge of uncured rubber during mold closure of said charge of uncured rubber for carrying out the displacement of rubber in the mold cavity and to hold the rubber under compression in the cavity, thereby forming at least a single void in the rubber article being molded by the pin means when the mold lid is placed on the lower mold element prior to curing; forming a circumferential rib on the rubber article upon insertion of the pin means by displacing rubber outwardly from the cavity and surrounding the mold cavity at the parting line between the mold lid and lower mold element; removing the mold lid and pin means from the lower mold element and rubber article, respectively, after curing; inserting air nozzle means downwardly into the void formed in the rubber article and gripping the molded rubber article within the void; injecting air from the nozzle means through the void against the bottom of the mold cavity to assist in stripping the article from the lower mold element; removing the molded rubber article from the lower mold element by moving the air nozzle means relative to the lower mold element; retaining the article on the air nozzle means while moving the air nozzle means; and removing automatically the gripped article from the air nozzle means after removal of the article from the lower mold element.

2. The method defined in claim 1 including the step of locating a warm-up mill adjacent the pot chamber supply of heated uncured rubber; heating a charge of uncured rubber in the warm-up mill; and transferring the heated charge of uncured rubber directly to the pot chamber.

3. The method defined in claim 1 including the further step of forming projection means on the lower portion of the rubber article by displacing rubber outwardly from the cavity adjacent the bottom surface thereof, said projection means assisting in retaining the rubber article in the lower mold element when the mold lid is removed therefrom.

4. The method defined in claim 1 including the step of coating the mold cavity with a layer of material having nonsticking properties with respect to the uncured rubber, said coating material adhering to the mold cavity and remaining adherred to said mold cavity after repeated molding operations.

5. In a rubber molding method of the type wherein a supply of heated uncured rubber is enclosed and pressed in a mold cavity formed by a mold element and a mold lid to displace the rubber in the cavity, and then the enclosed charge of rubber is cured while held under pressure to form a molded rubber article; the improvement including the steps of inserting pin means into the charge of uncured rubber during mold closure of said charge of uncured rubber for carrying out the displacement of rubber in the mold cavity and to hold the rubber under compression in the cavity, and for forming a void extending through the rubber article being molded by the pin means when the mold lid is placed on the mold element prior to curing; removing the mold lid and pin means from the mold element and rubber article, respectively, after curing to expose a portion of the rubber article and an end of the void formed therein; inserting air nozzle means into the void through the exposed end of the void and gripping the molded rubber article within the void; injecting air from the nozzle means through the void against the bottom of the mold cavity to assist in stripping the article from the mold element; moving the air nozzle means relative to the mold element; and retaining the article on the air nozzle means while moving the air nozzle means to remove the article from the mold element.

6. The method defined in claim 5 including the step of removing the gripped article from the air nozzle means after removing the article from the mold element by engaging kicker plate means.

7. The method defined in claim 5 including the step of forming a circumferential rib on the rubber article by displacing rubber outwardly from the cavity and surrounding the mold cavity at the parting line between the mold lid and mold element.

* * * * *